United States Patent [19]

Blum et al.

[11] Patent Number: 5,130,378

[45] Date of Patent: Jul. 14, 1992

[54] COPOLYMERS CONTAINING SECONDARY AMINO GROUPS AND A PROCESS FOR THEIR PRODUCTION

[75] Inventors: Harald Blum, Wachtendonk; Josef Pedain, Cologne; Christian Wamprecht, Neuss, all of Fed. Rep. of Germany

[73] Assignee: Bayer Aktiengesellschaft, Leverkusen, Fed. Rep. of Germany

[21] Appl. No.: 574,426

[22] Filed: Aug. 28, 1990

[30] Foreign Application Priority Data

Sep. 2, 1989 [DE] Fed. Rep. of Germany ....... 3929163

[51] Int. Cl.$^5$ ............................ C08F 8/32; C08F 22/40
[52] U.S. Cl. ...................... 525/327.6; 525/326.7; 525/374; 525/379; 525/380; 525/382; 548/548; 548/549
[58] Field of Search .................... 525/326.7, 378, 379, 525/380, 327.6; 548/548, 549

[56] References Cited

U.S. PATENT DOCUMENTS

| | | | |
|---|---|---|---|
| 3,639,357 | 2/1972 | Cohen | 525/327.6 |
| 3,778,418 | 12/1973 | Nakayama | 525/253 |
| 3,810,276 | 5/1974 | Morduchowitz | 117/132 B |
| 3,998,994 | 12/1974 | Decroix et al. | 526/15 |
| 4,503,182 | 3/1985 | Durand et al. | 524/474 |
| 4,511,369 | 4/1985 | Denis et al. | 44/62 |

FOREIGN PATENT DOCUMENTS

| | | |
|---|---|---|
| 1570594 | 2/1970 | Fed. Rep. of Germany . |
| 3024525 | 2/1982 | Fed. Rep. of Germany . |
| 1118418 | 6/1986 | Japan . |
| 2080313 | 2/1982 | United Kingdom . |

*Primary Examiner*—Joseph L. Schofer
*Assistant Examiner*—Fred Zitomer
*Attorney, Agent, or Firm*—Joseph C. Gil; Thomas W. Roy

[57] ABSTRACT

The present invention relates to copolymers prepared from olefinically unsaturated compounds, having a molecular weight ($M_n$) of 600 to 20,000 and containing 0.1 to 6.0% by weight of secondary amino groups, —NH—, in the form of structural units corresponding to formula I

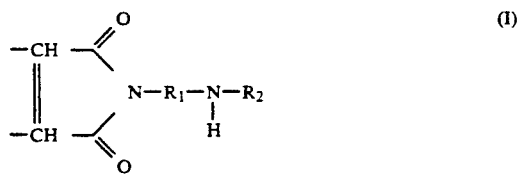

wherein $R_1$ is a saturated aliphatic hydrocarbon radical containing 2 to 6 carbon atoms, provided that at least two carbon atoms are arranged between the two nitrogen atoms, and $R_2$ is a methyl, ethyl or 2-hydroxyethyl group.

The present invention also relates to a process for the production of these copolymers.

2 Claims, No Drawings

COPOLYMERS CONTAINING SECONDARY AMINO GROUPS AND A PROCESS FOR THEIR PRODUCTION

BACKGROUND OF THE INVENTION

1. Field of the Invention

This invention relates to copolymers which, in addition to a cyclic imide structural unit, contain secondary, sterically substantially unhindered amino groups and to a process for the production of these products. The modified copolymers are produced by reaction of copolymers containing intramolecular carboxylic anhydride groups, more especially incorporated maleic anhydride groups, with certain primary/secondary diamines.

2. Description of the Prior Art

Previously, it was thought that the reaction between polyanhydrides and diamines containing primary or secondary, sterically unhindered amino groups led to crosslinked products due to the formation of polyimides or polyamides (cf. for example the relevant observations in DE-OS 3,024,525). This prior publication describes anhydride-functional polymers in which 67 to 95% of the anhydride groups are imidated with 4-amino-2,2,6,6-tetramethyl piperidine. According to DE-OS 3,024,525, the secondary amino group in this molecule is said to be sterically screened in such a way that it does not readily react with anhydrides so that, in the reaction of 4-amino-2,2,6,6-tetramethyl piperidine with polyanhydrides, only the primary amino group reacts with the cyclic imide.

The reaction of polymers and copolymers of maleic anhydride with diamines containing a primary or secondary amino group in addition to a tertiary amino group is known (DE-OS 1 570 594). In this case, the object of the reaction is to introduce tertiary amino groups which makes the polymers or copolymers soluble in aqueous acids. Since only one reactive amino group is present in the diamines, crosslinking reactions cannot of course take place during the modification.

It has now surprisingly been found that even diamines in which the secondary amino group is sterically hindered to only a minor extent, if at all, can be reacted with special maleic anhydride copolymers by a suitable process to form non-crosslinked polyimide copolymers containing free secondary amino groups.

SUMMARY OF THE INVENTION

The present invention relates to copolymers prepared from olefinically unsaturated compounds, having a molecular weight ($M_n$) of 600 to 20,000 and containing 0.1 to 6.0% by weight of secondary amino groups, -NH-, in the form of structural units corresponding to formula I

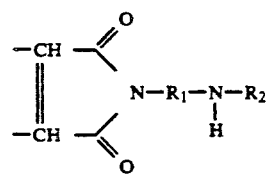

(I)

wherein
$R_1$ is a saturated aliphatic hydrocarbon radical containing 2 to 6 carbon atoms, provided that at least two carbon atoms are arranged between the two nitrogen atoms, and
$R_2$ methyl, ethyl or 2-hydroxyethyl group.

The present invention also relates to a process for the production of these copolymers containing amino groups by reacting copolymers which have a molecular weight of ($M_n$) 500 to 18,000, contain intramolecular acid anhydride groups incorporated in the polymer chain corresponding to formula III

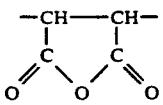

(III)

and are prepared from a mixture of olefinically unsaturated monomers containing a) 1 to 50 parts by weight of anhydride-functional monomers, b) 1 to 75 parts by weight of monomers corresponding to formula IV

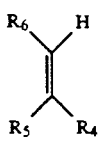

(IV)

c) 15 to 98 by weight monomers corresponding to formula V

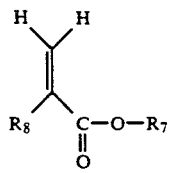

(V)

and d) 0 to 15 parts by weight polyolefinically unsaturated monomers, with primary/secondary diamines corresponding to formula VI

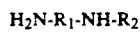

(VI)

or with mixtures of these diamines with up to 50 mole percent, based on the mixture, of aminoalcohols corresponding to formula VII

(VII)

to form imide groups at 100° to 200° C. and azeotropically distilling off the water or reaction at the same time and/or subsequently, wherein the equivalent ratio of primary amino groups to anhydride groups is 1:1 to 2:1 and wherein $R_1$ and $R_2$ are as already defined, $R_3$ is a saturated hydrocarbon radical containing 2 to 6 carbon atoms, $R_4$ is hydrogen, a methyl group, chlorine or fluorine, $R_5$ is an aliphatic hydrocarbon radical containing 2 to 15 carbon atoms, a cycloaliphatic hydrocarbon radical containing 5 to 10 carbon atoms, an araliphatic hydrocarbon radical containing 7 to 18 carbon atoms, an aromatic hydrocarbon radical containing 6 to 12 carbon atoms, chlorine, fluorine, a nitrile group or an aliphatic hydrocarbon radical containing 2 to 18 carbon atoms which contains oxygen and/or nitrogen in the form of ether, ester, amide, urethane or keto groups, $R_6$ is hydrogen or, together with $R_5$ and the two carbon atoms, forms an olefinically unsaturated cycloaliphatic hydrocarbon ring containing 5 to 6 carbon atoms, $R_7$ represents an aliphatic or cycloaliphatic hydrocarbon radical containing 1 to 18 carbon atoms which may contain oxygen or nitrogen as heteroatoms and which may also contain hydroxyl groups as substituents and $R_8$ is hydrogen or a methyl group.

DETAILED DESCRIPTION OF THE INVENTION

The new copolymers containing secondary amino groups have a number average molecular weight ($M_n$, determined by gel permeation chromatography using polystyrene as standard) of 600 to 20,000, preferably 1,600 to 7,000; 0.1 to 6.0, preferably 0.5 to 3.0% by weight of secondary amino groups (expressed as —NH—, molecular weight =15) in the form of structural units corresponding to formula I; and 0 to 4.5, preferably 0.1 to 2.5% by weight of hydroxyl groups in the form of structural units corresponding to formula II

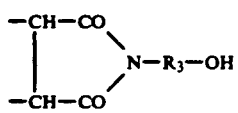

of from 0 to 4.5% by weight and preferably from 0.1 to 2.5% by weight.

In the process according to the invention, the copolymers containing secondary amino groups are preferably produced by reacting the analogous copolymers containing intramolecular anhydride groups corresponding to formula III with certain primary/secondary diamines corresponding to formula VI which may optionally be used in admixture with aminoalcohols corresponding to formula VII.

The copolymers containing intramolecular carboxylic anhydride groups used in the process according to the invention have a number average molecular ($M_n$, weight determined by gel permeation chromatography using polystyrene as standard) of 500 to 18,000, preferably 1,000 to 15,000 and more preferably 1,500 to 6,000. Their anhydride equivalent weight (weight containing 1 mole of anhydride groups) is 196 to 9,800, preferably 245 to 1,960 and more preferably 392 to 980.

The copolymers containing intramolecular carboxylic anhydride groups are prepared from a) 1 to 50, preferably 5 to 40 and more preferably 10 to 25 parts by weight of anhydride-functional monomers, b) 1 to 75, preferably 3 to 60 and more preferably 5 to 50 parts by weight of monomers corresponding to formula IV, c) 15 to 98, preferably 25 to 85 and more preferably 30 to 75 parts by weight monomers corresponding to formula V and d) 0 to 15, preferably 0 to 5 parts by weight polyolefinically unsaturated monomers.

Suitable and preferred monomers a) include maleic anhydride, itaconic anhydride and citraconic anhydride; maleic anhydride is particularly preferred.

Suitable monomers b) are those corresponding to formula IV above in which R R and R6 are as already defined. However, preferred monomers b) are those corresponding to formula (IV) wherein $R_4$ is hydrogen or a methyl group, $R_5$ is a phenyl radical and $R_6$ is hydrogen.

Suitable and preferred monomers b) include styrene, vinyl toluene, α-methyl styrene, α-ethyl styrene, ethyl vinyl ether, n-propyl vinyl ether, isopropyl vinyl ether, n-butyl vinyl ether, isobutyl vinyl ether, vinyl acetate, vinyl propionate, vinyl butyrate, 1-octene, 1-decene, 1-hexene, vinyl cyclohexene, cyclooctene and mixtures of these monomers.

Suitable monomers c) are compounds corresponding to formula V wherein $R_7$ and $R_8$ are as already defined. Preferred monomers c) include compounds corresponding to formula V wherein $R_7$ is an aliphatic hydrocarbon radical containing 1 to 18 carbon atoms and $R_8$ is hydrogen or a methyl group.

Suitable and preferred monomers c) include methyl methacrylate, ethyl acrylate, ethyl methacrylate, n-butyl acrylate, n-butyl methacrylate, isobutyl acrylate, isobutyl methacrylate, 2-ethyl hexyl acrylate, 2-ethyl hexyl methacrylate, octyl acrylate, octyl methacrylate, lauryl acrylate, lauryl methacrylate, dodecyl acrylate, dodecyl methacrylate, cyclohexyl acrylate, 2,2,3,3-tetrafluoropropyl methacrylate and mixtures of these monomers. Also suitable are monomers containing hydroxyl groups such as hydroxyethyl, hydroxypropyl or hydroxybutyl acrylate or methacrylate which may be used in quantities of up to 15% by weight, based on the weight of all the monomers.

Suitable and preferred monomers d) include hexanediol bisacrylate, trimethylol propane trisacrylate, pentaerythritol trisacrylate, neopentyl glycol bisacrylate, divinyl benzene.

The anhydride-functional comonomers are prepared in known manner by a radical-initiated copolymerization, preferably in the presence of organic solvents. The polymerization medium may be any of the known paint solvents which are inert to the monomers and the copolymers under the polymerization conditions.

Suitable solvents include esters such as butyl acetate, isobutyl acetate, sec.-butyl acetate, amyl acetate, hexyl acetate, benzyl acetate, ethoxypropyl acetate, propylene glycol methyl ether acetate, oxohexyl acetate (Exxate 600, available from Exxon), oxoheptyl acetate (Exxate 700, available from Exxon); ethers such as dibutyl ether, dioxane and dimethyl diglycol; hydrocarbons such as gasoline, turpentine oil, solvent naphtha, terpenes, toluene, xylene and ethyl benzene; ketones such as methyl isobutyl ketone, methyl n-amyl ketone, methyl Soamyl ketone, diethyl ketone, ethyl butyl ketone, diisopropyl ketone and cyclohexanone; and mixtures of such solvents.

Preferred solvents are those which have a boiling point under normal conditions of ≧110° C. and solvents which form an azeotrope with water such as xylene, butyl acetate, solvent naphtha and oxohexyl acetate.

The copolymerization is typically carried out at solids contents of 30 to 95% by weight and in an inert gas atmosphere, for example nitrogen.

Preferably, the solvent is initially partly or completely introduced into the reaction vessel and then the monomer mixture, initiator and, optionally, the remainder of the solvent are continuously introduced. After the addition, the reaction mixture is stirred. The polymerization is terminated after a monomer conversion of more than 96%, preferably more than 99%.

Post-activation by the subsequent addition of small quantities of initiator may be necessary in order to achieve the desired monomer conversion. With certain monomer starting compositions, it is possible that relatively large quantities of residual monomers may be present in the copolymer after the polymerization. For reasons of cost and in cases where this may adversely affect the intended application or the property level, it is advantageous to reduce this residual monomer content either by distillation or by post-activation with initiator.

The anhydride-functional monomers may also be partly introduced together with the solvent or the anhydridefunctional monomer may be added more quickly than the other monomers. This modified procedure can improve the compatibility or other properties of the binders in certain cases.

The monomer conversion is determined from the solids content of the reaction mixture and verified by analysis of the residual monomers by gas chromatography.

It is preferred to use radical formers which are suitable for reaction temperatures of 60° to 180° C., e.g., organic peroxides such as dibenzoyl peroxide, ditert.-butyl peroxide, dilauryl peroxide, tert.-butyl peroctoate, tert.-butyl peroxymaleate, tert.-butyl peroxybenzoate, dicumyl peroxide and didecanoyl peroxide; and azo compounds such as 2,2'-azo-bis-(2,4-dimethylvaleronitrile), 2,2'-azo-bis-(isobutyronitrile), 2,2'-azo-bis-(2,3-dimethylbutyronitrile) and 1,1'-azo-bis(1-cyclohexanenitrile).

The initiators may be used in quantities of 0.5 to 10% by weight, based on the total monomers. Molecular weight regulators such as n-dodecyl mercaptan, tert.-dodecyl mercaptan, etc., may be used in quantities of 0 to 10% by weight.

To carry out the process according to the invention, the anhydride groups present in the copolymers are converted into imide groups. This is preferably done in 10 to 80% by weight organic solution in a solvent of the type previously set forth by a reaction with diamines corresponding to formula VI or with mixtures of such diamines with up to 50 mole percent, based on the mixtures, of aminoalcohols corresponding to formula VII.

Suitable diamines corresponding to formula VI include 2-amino-1-(methylamino)-ethane, 2-amino-1-(ethylamino)-ethane, 2-amino-1-[(2-hydroxyethyl)-amino]-ethane, 3-amino-1-(methylamino)-propane, 3-amino-1-(ethylamino)-propane, 3- amino-1-[(2-hydroxyethyl)-amino]-propane, 4-amino-1-(methylamino)-butane, 4-amino-1-(ethylamino)-butane, 4-amino-1-[(2-hydroxyethyl)-amino]-butane, 6-amino-1-(methylamino)-hexane, 6-amino-1-ethylamino)-hexane and 6-amino-1-(2-hydroxyethyl)-amino]-hexane.

Preferred diamines are 1-amino-3-(methylamino)-propane and 2-amino-1-[(2-hydroxyethyl)-amino]-ethane.

Suitable aminoalcohols include 2-aminoethanol, 3-aminopropanol, 2-aminopropanol and 1-amino-2-propanol.

To carry out the process according to the invention, the diamines (VI) and, optionally, aminoalcohols (VII) are used in quantities corresponding to an equivalent ratio of primary amino groups to acid anhydride groups of 1:1 to 2:1, preferably from 1:1 to 1.5:1 and more preferably 1:1 to 1.2:1.

To carry out the process according to the invention, the amine component (amine component is either diamine or a mixture thereof with aminoalcohol) is dissolved in a suitable solvent and the solution is introduced into the reaction vessel, heated to temperatures above 60° C., preferably at least 100° C. The anhydride-functional copolymer, which is also preferably dissolved in a solvent is added at a reaction temperature of at 60° to 200° C., preferably at 100° to 150° C. The reaction may be conducted such that, as the polymer is added, the water of reaction is azeotropically distilled off through a water separator. In another embodiment variant of the process, the total quantity of anhydride-functional copolymer may be added first and the water of reaction subsequently removed.

The removal of water is continued at 60° to 200° C., preferably at 100° to 150° C., until either the theoretical quantity of water has been removed or until no more water can be removed. The elimination of water may be accelerated by an inert gas stream, for example nitrogen, which is passed either through or over the reaction mixture. The imidation reaction is continued until the end products have acid values of <25, preferably <15 and more preferably <10, based on solids. Acid values are always based on solids and include all acid anhydride groups, free carboxyl groups and carboxylate groups present in the form of amine salts which can be determined by titrimetry with KOH.

To obtain particularly low acid values, it may be advisable under certain conditions to add further small quantities (about 0.05 to 0.2 equivalents) of diamine towards the end of the reaction in order, for example, to replace losses by azeotropic distillation.

The molecular weights ($M_n$) of the amino-functional polyimide copolymers substantially correspond to the molecular weights ($M_n$) of the anhydride-functional copolymers plus the calculated molecular weights of the diamines and optionally aminoalcohols used minus the quantity of water eliminated.

When anhydride-functional copolymers and diamines are mixed, highly viscous intermediate products can form depending upon the reaction conditions, particularly when anhydride-functional copolymers of high molecular weight and/or high anhydride equivalent weight are used. In these cases, it may be advisable to keep the concentration of the reaction products at a low level. In the course of the reaction, however, the viscosity of such products falls again to a relatively low level. It should always be possible to stir the products.

On completion of the imidation reaction, excess diamine may be removed from the end product, if necessary, by brief distillation, for example azeotropically with a suitable solvent such as xylene, butyl acetate, solvent naphtha and oxohexyl acetate.

The amino functional polyimide copolymers according to the invention are readily soluble polymers having acid values <25. They are eminently suitable as a binder or binder component for coating compositions, sealing compositions, adhesives or printing inks. They are preferably processed as two-component systems in combination with suitable curing agents. Suitable curing agents for the copolymers containing amino groups according to the invention include organic polyisocyanates, polyepoxides, melamine resins and olefinically unsaturated crosslinking agents such as acryloyl-functional copolymers or esterification products of acrylic acid with polyhydric alcohols which are capable of undergoing a Michael reaction.

In the following examples, all "parts" and "percentages" are by weight, unless otherwise indicated.

EXAMPLES

Example 1 a) 1,602 g xylene were heated under nitrogen to 120° C. in a 4 liter three-necked flask equipped with a stirrer, cooling and heating system. A mixture of 300 g maleic anhydride, 600 g n-butyl acrylate, 420 g 2ethyl hexyl methacrylate and 600 g xylene was added over a period of 3 hours. 114 g tert.-butyl peroctoate (in the form of a 70% solution in a hydrocarbon solvent) were added beginning at the same time for a period of 3.5 hours. The reaction mixture was then stirred for 2 hours at 130° C. An anhydride-functional copolymer was obtained in the form of a 55% solution. The molecular weight ($M_n$) was 3,800 and the anhydride equivalent weight was 653, based on solids.

b) 20.4 g (1.1 equivalents) 1-amino-3(methylamino)-propane and 80.5 g xylene were weighed into a 0.5 liter three-necked flask equipped with a stirrer, cooling and heating system and water separator and heated to 120° C. 250 g of polymer 1a (1.0 equivalent) were added over a period of 1 hour. After the addition with 100 g xylene, the reaction mixture was heated on a water separator until no more water was eliminated. To distill off entraining agent, the reaction temperature was increased to 140° C.; excess 1-amino-3-methylaminopropane was also distilled off. The polyimide copolymer 1b was obtained in the form of a 49% solution. It had an acid value of approximately 3. The copolymer contained 1.3% by weight, based on solids, of secondary amino groups, —NH—, in the form of structural units corresponding to the following formula:

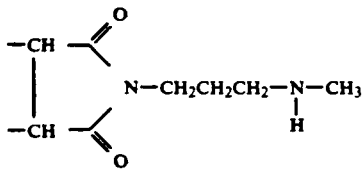

EXAMPLE 2 a) 1,333 g solvent naphtha (hydrocarbon mixture, boiling point 165°-180° C.) were heated to 147° C. in a 4 liter reaction vessel equipped with a stirrer, cooling and heating system. A mixture of 200 g maleic anhydride, 500 g methyl methacrylate, 600 g n-butyl acrylate and 600 g styrene was added over a period of 3 hours. 100 g di-tert.-butyl peroxide was added beginning at the same time for a period of 3.5 hours. After stirring for another 1.5 hours at 145° C., the anhydride-functional copolymer 2a was obtained in the form of a 60% solution. It had a molecular weight ($M_n$) of 2,200 and an anhydride equivalent weight of 980, based on solids.

b) 133.5 g solvent naphtha, 21.4 g 1-amino-2-[(2-hydroxyethyl)-amino]-ethane (1.1 equivalents) and 300 g of the anhydride-functional copolymer 2a (1.0 equivalent) were reacted as described in Example 1b in a 0.5 liter reaction vessel equipped with a stirrer, cooling and heating system. The polyimide copolymer 2b was obtained in the form of a 45% solution. It has an acid value of approximately 4. The copolymer contained 1.4% by weight, based on solids, of secondary amino groups, -NH- in the form of structural units corresponding to the following formula

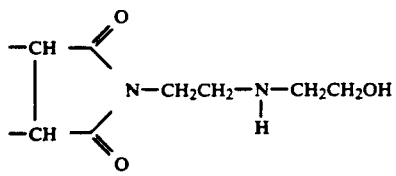

EXAMPLE 3 a) 1,667 g oxohexyl acetate (Exxate 600, available from Exxon) were heated to 148° C. in a 5 liter reaction vessel equipped with a stirrer, cooling and heating system. A mixture of 375 g maleic anhydride, 750 g butyl acrylate, 300 g methyl methacrylate and 950 g styrene was added over a period of 3 hours. 125 g di-tert.-butyl peroxide was added beginning at the same time for a period of 3.5 hours. After stirring for 2 hours, the anhydride-functional copolymer 3a was obtained in the form of a 60% solution. It had a molecular weight ($M_n$) of 2,900 and an anhydride equivalent weight of 653, based on solids.

b) 52.8 g 1-amino-2-[(2-hydroxyethyl)-amino]-ethane (1.1 equivalents), 234.5 g oxohexyl acetate and 500 g (1.0 equivalent) of copolymer 3a were reacted as described in Example 1b. The polyimide polymer 3b was obtained in the form of a 46% solution. It had an acid value of approximately 2. The copolymer contained 2.0% by weight, based on solids, of secondary amino groups, —NH—, in the form of the structural unit set forth in Example 2.

EXAMPLE 4

18.1 g (1.1 equivalents) 3-amino-1-(methylamino)-propane, 185 g solvent naphtha and 300 g (1.0 equivalent) of anhydride-functional copolymer 2a were reacted as described in Example 1b. The polyimide copolymer 4b was obtained in the form of a 52% solution. It had an acid value of approximately 5. The copolymer contained 1.4% by weight, based on solids, of secondary amino groups, —NH—, in the form of the structural unit set forth in Example 1.

EXAMPLE 5 a) 1,002 g xylene were heated to 120° C. in a 4 liter reaction vessel equipped with a stirrer, cooling and heating system. A mixture of 600 g xylene, 460 g maleic anhydride, 1,000 g 2-ethyl hexyl acrylate and 460 g styrene was added over a period of 3 hours. 114 g tert.-butyl peroctoate (70%) was added beginning at the same time for a period of 3.5 hours. After stirring for another 2 hours, a 55% copolymer 5a was obtained and then diluted with xylene to 50%. It had a molecular weight ($M_n$) of 2,500 and an anhydride equivalent weight of 426, based on solids.

b) 45.4 g 3-amino-1-(methylamino)-propane (1.1 equivalents), 100 g xylene and 400 g of anhydride-functional copolymer 5a (1.0 equivalent) were reacted as described in Example 1b). The polyimide copolymer 5b was obtained in the form of a 43% solution. It had an acid value of 4. The polymer contained 3.0% by weight, based on solids, of secondary amino groups, —NH—, in the form of the structural unit set forth in Example 1.

EXAMPLE 6

7 g 1-amino-2-propanol (0.5 equivalent), 8.2 g 1-amino-3-(methylamino)-propane (0.5 equivalent), 252 g solvent naphtha and 300 g of the anhydride-functional copolymer 2a) were reacted as described in Example 1b) to form the polyimide polymer 6b. It had an acid value of 7 and accumulated in the form of a 51% solution. The polymer contained 0.7% by weight, based on solids, of secondary amino groups, —NH—, in the form of the structural unit set forth in Example 1 and 0.8% by weight of hydroxyl groups in the form of structural units corresponding to the formula:

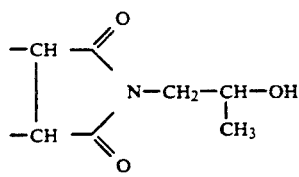

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A copolymer having a molecular weight ($M_n$) of 600 to 20,00 and comprising 0.1 to 6.0% by weight of secondary amino groups, —NH—, in the form of structural units corresponding to formula I

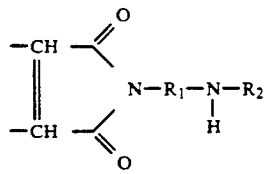

said copolymer being based on the reaction product of a primary/secondary diamine of the formula

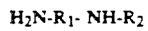

with a copolymer containing intramolecular anhydride groups and consisting essentially of the reaction product of a) 1 to 50 parts by weight of an anhydride-functional monomer,
b) 1 to 75 parts by weight of a monomer corresponding to formula IV

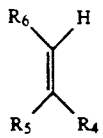

c) 15 to 98 parts by weight of a monomer corresponding to formula V

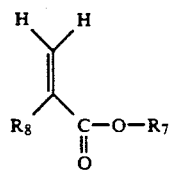

and
d) 0 to 15 parts by weight of a polyolefinically unsaturated monomer, under conditions sufficient to form the imide groups set forth in formula I, wherein
$R_1$ is a saturated aliphatic hydrocarbon radical containing 2 to 6 carbon atoms, provided that at least two carbon atoms are arranged between the two nitrogen atoms and
$R_2$ is a methyl, ethyl or 2-hydroxyethyl group,
$R_4$ is hydrogen or a methyl group,
$R_5$ is an aromatic hydrocarbon radical containing 6 to 12 carbon atoms,
$R_6$ is hydrogen,
$R_7$ is an aliphatic cycloaliphatic hydrocarbon radical containing 1 to 18 carbon atoms which may contain oxygen or nitrogen as heteroatoms and which may also contain hydroxyl groups as substituents and
$R_8$ is hydrogen or a methyl group.

2. The copolymer of claim 1 which additionally comprises 0.1 to 2.5% by weight of hydroxyl groups in the form of structural units corresponding to formula II

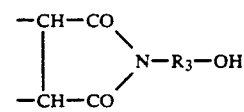

wherein
$R_3$ is a saturated hydrocarbon radical containing 2 to 6 carbon atoms.

* * * * *